April 28, 1925. 1,535,754
A. S. WILLIAMS
METHOD OF AND APPARATUS FOR SEPARATING GASES AND LIQUIDS
Filed Sept. 4, 1923 2 Sheets-Sheet 1
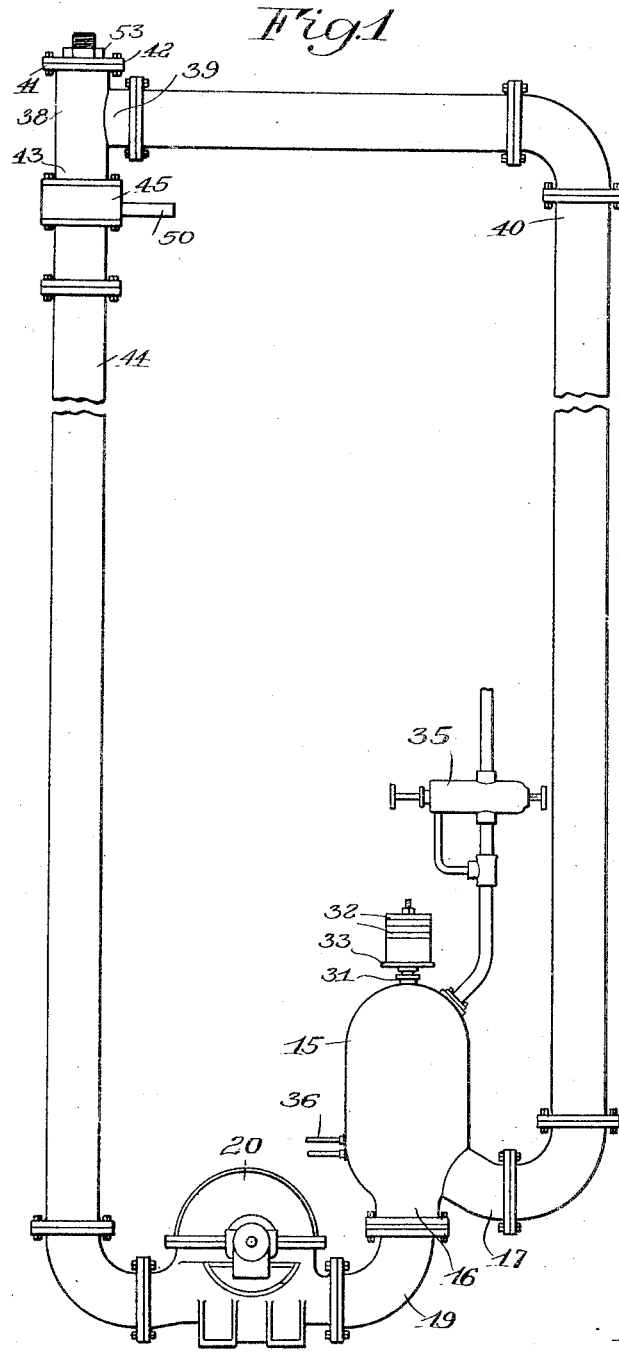
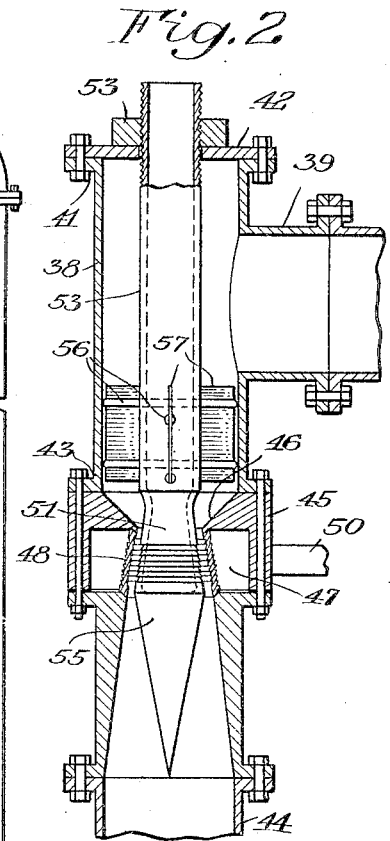
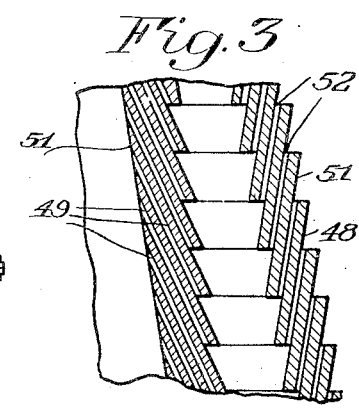
INVENTOR.
Arthur Shaler Williams
BY
his ATTORNEY

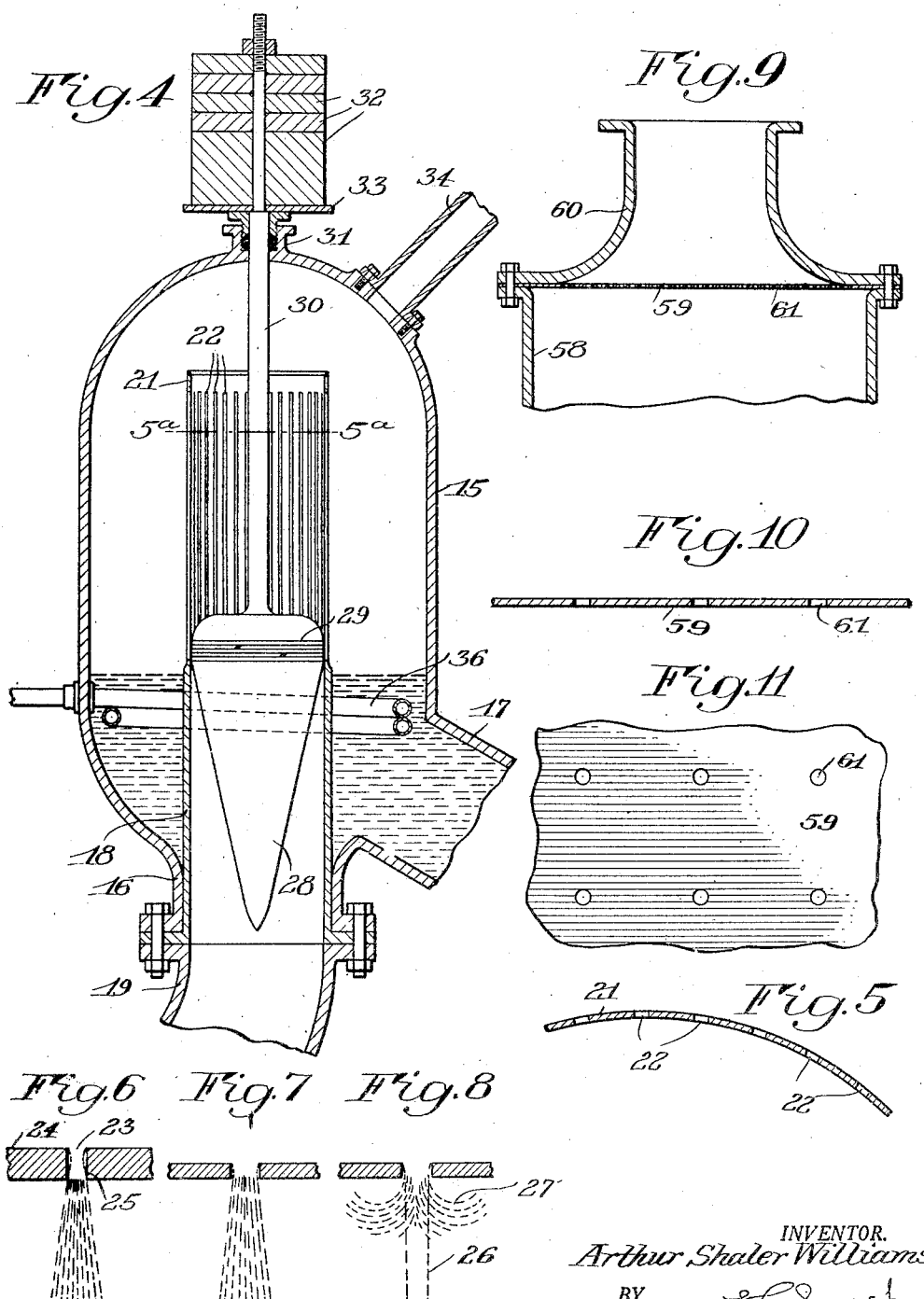

Patented Apr. 28, 1925.

1,535,754

UNITED STATES PATENT OFFICE.

ARTHUR SHALER WILLIAMS, OF ITHACA, NEW YORK.

METHOD OF AND APPARATUS FOR SEPARATING GASES AND LIQUIDS.

Application filed September 4, 1923. Serial No. 660,684.

*To all whom it may concern:*

Be it known that I, ARTHUR SHALER WILLIAMS, a citizen of the United States, residing at Cliff Park, Ithaca, in the county of Tompkins and State of New York, have invented certain new and useful Improvements in Methods of and Apparatus for Separating Gases and Liquids; and I do hereby declare the following to be a full, clear, and exact description of the same, reference being had to the accompanying drawings forming a part of this specification and to the reference numerals marked thereon.

This invention relates to methods of and apparatus for separating gas and liquid from a mixture thereof, one object of the invention being to provide a simple and practical method and apparatus for rapidly separating a mixed gas and liquid in a comparatively small space and at a comparatively low cost.

Another object of the invention is to provide a method and apparatus of the above described character for efficiently separating a gas under pressure from a compressed mixture of gas and liquid applicable for example to the hydraulic compression of air.

Still a further object is to provide such a method and apparatus in combination with an advantageous compression system for economically producing compressed air or other gases.

To these and other ends the invention resides in certain improvements and combinations of parts all as will be hereinafter more fully described, the novel features being pointed out in the claims at the end of the specification.

In the drawings:

Fig. 1 is an elevation partly broken away of apparatus employed in and embodying the present invention.

Fig. 2 is an enlarged central sectional elevation of a mixture forming device or injector shown in Fig. 1.

Fig. 3 is an enlarged detail sectional view of parts shown in Fig. 2.

Fig. 4 is an enlarged central sectional elevation showing the separating device.

Fig. 5 is an enlarged sectional view on the line 5ª—5ª in Fig. 4.

Figs. 6, 7 and 8 are diagrammatic views illustrating the operation of the separating device.

Fig. 9 is a central sectional elevation of a modified form of separating device.

Fig. 10 is an enlarged view of a separation partition shown in Fig. 9 and

Fig. 11 is a plan view of the partition shown in Fig. 10.

Similar reference numerals throughout the several views indicate the same parts.

The invention provides a method of separating gas and liquid from a mixture thereof consisting, generally speaking, in the breaking up of the mixture into a state of relatively fine subdivision affording a large surface exposure, and subjecting the subdivided mixture to a comparatively small but sudden drop in pressure, as by causing the mixture to flow through a multiplicity of comparatively small orifices, having a definite ratio between the length and breadth thereof, from a region of higher into a space of slightly lower pressure and thereby causing the gas to quickly separate out from the mixture. The latter may first be formed and compressed and then subjected to the slight and partial drop in pressure required to produce the separation, to thus yield a supply of compressed gas. The invention comprises as well an efficient and advantageous apparatus for carrying out the above method and is disclosed in the present instance, by way of illustration, as applied to the separation of a mixture of air and water in the hydraulic compression of air, although it is to be understood that the utility and advantages of the invention are by no means limited to use for this particular purpose. This method of separating and compressing a gas and the apparatus for accomplishing the same can be best described in connection with the operation and construction of the present embodiment which comprises, primarily, a gas and liquid separating device, a device for mixing the gas and liquid, and means for supplying the mixture so formed to the separating device under pressure.

Referring to Figs. 1 and 4 of the drawings for a description first of the separator, there is shown at 15 a container preferably in the form of a steel shell or tank, having at its bottom a flanged inlet connection 16 and above the latter at one side a flanged outlet conduit 17. Fitted in the connection 16 is an upwardly extending tubular member 18 having a flanged lower end for attachment to the flange of the connection.

Bolted to the lower end of the tubular member is a pipe elbow 19 of the same diameter as the member and communicating at its other end with the discharge outlet of a centrifugal pump 20 hereafter described for supplying the mixture under pressure to the separator. The upper portion of tubular member 18 has a wall 21 of thin material formed with a multiplicity of spaced orifices of small width. These orifices may be substantially circular openings, or narrow slots, as shown at 22, extending vertically in spaced relation with each other. Whatever the shape of the orifices, they are of the character technically known as "thin-plate" orifices, by which is meant, substantially, that the wall or partition in which the orifices are formed has a thickness equal to or preferably less than the width or diameter of the individual orifices. Thus in the present embodiment the wall portion 21 has a thickness of $\frac{1}{16}$ of an inch and the slots a width of $\frac{1}{8}$ of an inch, with a spacing between the centers of adjacent slots of 1 inch. It is well known that such orifices produce in a transmitted fluid stream results differing materially from those produced by what are known as "nozzle" or "thick-plate" orifices which commonly have a length two to three times the orifice width or diameter. A mixture of gas and liquid, forced as hereafter described through conduit 19 and tubular member 18, is discharged through the orifices of the latter in a state of relatively fine subdivision and large surface exposure, into container 15 and with the latter maintained at a slightly lower pressure than in member 18, by means to be described later, the mixture is suddenly subjected at the orifices to a slight drop in pressure which causes an immediate and complete separation or bursting out of the gas from the mixture. The gas of course, fills the top of container 15 and the liquid drops to the bottom. This pressure drop at the orifice is, preferably less than five pounds per square inch and best results have in fact been obtained with a pressure drop of one pound or less.

When a liquid flows through an orifice, the stream first contracts according to well known principles as it gains velocity at the entrance, as indicated at 23, Figure 6. which illustrates diagrammatically the operation of a "thick-plate" orifice in a partition 24. If the pressure drop through the orifice be relatively high, say over five pounds per square inch, the stream at once attains a high velocity with the result that cross currents are inevitably set up which disturb and agitate the stream, causing it to at once break up and become divergent or "broomy" in character as it flows off at high velocity. This "broomy" discharge is well known as particularly characteristic of a "thick-plate" orifice for the reason that the divergence of the stream causes it to frictionally engage the walls of the orifice at the outlet end as at 25 and to be thereby rendered more agitated and "broomy". Gas mixed with a liquid passing through an orifice from a higher to a lower pressure tends under suitable conditions to instantly expand at the orifice, burst the surface tension of the liquid and escape, but this tendency is largely overcome where a high pressure difference exists because the bursting effect of the air is smothered and lost in the agitated, "broomy" stream and the high velocity of the latter maintains the air entrapped and carries it along for an indefinite distance. In a "thick-plate" orifice, furthermore, the air cannot have instantaneous expansion because restrained by the walls of the orifice so that it remains in and is carried along by the broomy stream.

The same result is substantially true though perhaps to a less degree, in the case of a "thin-plate" orifice operating with a high pressure difference, as illustrated diagrammatically in Figure 7. Here the liquid, or mixture of gas and liquid, leaps clear of the orifice lips, but the agitation of the stream and its high velocity overcomes the bursting effect of the expansion of contained gas as described above and carries the latter along entrained in the stream.

When liquid flows through a "thin-plate" orifice with but a small difference in pressure between opposite sides thereof, of, say, five pounds per square inch or less, it contracts as described, clears the orifice lips and forms a clear, smooth cylindrical bar moving at relatively low velocity as indicated in dotted lines at 26, Figure 8. A gas mixed in the liquid thus undergoes a substantially instantaneous drop in pressure without restraint upon its expansion by orifice walls, or the cross currents and broken character of a "broomy" stream tending to sweep it along at high velocity. In other words, the gas is subjected to a sudden drop in pressure under conditions ideally favoring immediate lateral expansion with the result that it bursts and atomizes the stream at the discharge side of the orifice, as indicated at 27, so that practically all of the gas separates out in a dry condition while the liquid and its vapor condense and fall substantially free from gas. The higher the saturation or gas content of the mixture, the better the results obtained, for which purpose the mixture is preferably formed with a maximum proportion of gas depending somewhat, of course, upon the apparatus used. A mixture of equal proportions by volume of air and water for example has been formed and found to give satisfactory results.

Orifices of small width or diameter are required to produce the subdivided condition of the mixture which assists the atomizing action upon the liquid of the expansion of the gas. Reducing the width of the orifice effects a more nearly instantaneous separation at the orifice outlet and therefore reduces the free space required for the separating action at this side of the partition. A space of six or eight inches between the partition and the surface of the separated liquid, or other obstruction, has been found ample. The spacing of the orifices from one another in the partition should be such as to avoid interference.

It is to be noted that the complete and rapid separation afforded by the present invention is accomplished not by merely breaking up the mixture by mechanical deflection nor by spraying, but by subjecting it in subdivided condition to a slight drop in pressure under conditions rendering possible the instantaneous and unimpeded expansion which of itself breaks up and atomizes the liquid and frees the gas.

Means are provided for maintaining the specified pressure difference between opposite sides of the orifices comprising, preferably, a piston 28 having a sliding fit in the bore of member 18 and efficiently shaped as shown to reduce the friction of flow of the mixture. The piston is preferably provided with packing rings 29 and is fixed on the lower end of a rod 30 sliding in a packed bearing 31 in the upper end of the container. The pressure of mixture flowing through conduit 19 tends of course to raise the piston to uncover more or less of the length of the orifice slots and means are provided for applying an adjustable force to the piston in a downward direction comprising in the present instance a series of weights 32 removably supported on a platform 33 on the upper end of the rod. Adjustable springs or other means, of course, may be used instead of the weights, the purpose being to apply an adjustable force to the piston, suited to the conditions of operation, for automatically uncovering more or less orifice area. It is apparent that while the lower side of the piston is subjected to the pressure of the mixture in member 18, its upper side is subjected to the pressure in container 15 and the parts are so proportioned, and balanced by the adjustable weight means 32 that when the pressure in container 15 falls below a desired degree, the pressure of the mixture in container 18 raises the piston and uncovers more orifice area with the result that more gas is separated in the container to raise the pressure therein. Similarly when the pressure in container 15 rises to a given relation with that of the mixture in member 18, the piston falls as the result of the pressure on its upper side and decreases the flow of the mixture with the result of lowering the pressure in the container. By this means a slight pressure difference of one pound or less may be maintained between opposite sides of the orifices as desirable for efficient separation.

At 34 is a pipe connection with the upper portion of the container through which the air or other gas may be drawn off at a pressure only a little less than that to which the mixture is subjected. Pipe 34 may be provided with any well known variety of automatic pressure regulating valve, indicated generally at 35, for shutting off the flow through the pipe should the pressure in the container fall below that desired, or when starting the apparatus. At 36 is a coil for circulating a temperature controlling medium such as cooling water through the liquid in the container for regulating its temperature.

The above described separating device may be connected in a continuous conducting or pipe system as in the present case and as illustrated in Figure 1, which system includes, in addition to the pump means 20, of one or a plurality of stages for compressing the mixture, a gas intake or mixing device 37 hereafter described. In this arrangement, of course, the same supply of liquid is utilized over and over again. In addition to the use of pump means for compressing the mixture, the conducting system may be extended vertically as shown to any desired height with the separator adjacent the bottom for operation under a gravity head. The gas intake is in this arrangement preferably located adjacent the top of the system since its efficiency is highest under a comparatively low pressure. Instead of repeated use of the same liquid in a continuous system, the separator may be employed to treat a supply of mixture flowing continuously from a suitable source and discharged after separation into gas and liquid, as for example in conjuction with the gravity flow system of the known Taylor hydraulic compression apparatus. And, of course, the separator may be used for treating natural as well as artificially formed mixtures. By employing a plurality of compressing systems such as described herein, connected in series with the gas discharge of one supplying the gas to be compressed in the next, a high pressure may be built up as desired.

The means for producing the mixture of gas and liquid comprises preferably a T-shaped pipe section 38, Figs. 1 and 2, one connection 39 communicating through piping 40 with the liquid discharge branch 17 of the separator. Another branch 41 of the injector is closed as by means of a plate 42. The third branch 43 communicates through an injector part proper of advantageous construction and through piping 44 with the intake of the pump. This injector device comprises a head 45 bolted to the flanged branch 43 of the T-section 38. The end of the head joining the T-section has a conically reduced bore forming a throat 46 as shown. The other end of the head is chambered as at 47 and carries therein a conical sleeve 48 joining at its smaller end the contracted portion of throat 46. The bore of the sleeve is circumferentially grooved as shown, providing a saw-tooth shape in cross section and from the bottom of each groove at a multiplicity of points spaced about its circumference openings 49 are drilled at an inward and downward inclination as shown to admit air to a body of liquid passing through the throat. The air is admitted to the chamber 47 as by means of pipe 50 and is thus supplied in ample quantities over substantially the entire outer circumference of the liquid stream. Means are also provided for admitting gas in a similar manner to the interior of the liquid stream comprising a core piece 51 of substantially conical shape with sides generally parallel to and spaced from the inner surface of sleeve 48. This core piece is exteriorly grooved circumferentially in a manner similar to that described for the sleeve 48 and provided with gas ducts 52 discharging into the grooves downwardly and toward the liquid stream, being supplied through the hollow center of the core piece. The latter communicates with and is carried at the lower end of a pipe section 53 passed at its upper end through a central opening in plate 42 and carrying a nut 54 by turning which the core piece may be raised or lowered to increase or decrease the area of opening of the injector throat and thus vary the volumn and velocity of liquid passing therethrough. The lower end 55 of the core piece is conically tapered as shown to reduce friction in the fluid current. Above the core piece and below the inlet branch 39, pipe 53 has rods 56 passed therethrough with externally projecting ends slotted to receive vanes 57 for insuring vertical flow of the water to the injector throat. It is apparent from the above description that as liquid is supplied through the injector its pressure is partially converted into velocity at the throat opposite the gas intake nozzles 49 and 52 through which gas is drawn and mixed with the liquid. It is to be noted that the liquid is passed through an annular throat surrounded in a substantially continuous manner with air intake means both externally and internally, from which it results that the liquid takes in a maximum quantity of gas in thoroughly mixed condition. From this intake device or injector the mixture is conducted to the pump inlet.

In Figures 9, 10 and 11 is shown a modified form of separator device comprising a container 58 having a flanged top as shown on which is placed a partition 59 secured in position by a connection 60 bolted to the top of the container with the partition interposed between them. The discharge of the pump communicates with the connection 60. The partition, in this instance, is in the form of a thin plate provided with small, circular orifices 61 arranged in spaced relation as shown, and having the same relation in size to the thickness of the partition already described. The desired pressure difference between opposite sides of the partition in this case may be maintained by hand valves controlling the supply of mixture and the discharge of the gas in connection with pressure gauges or by other suitable means.

The operation of the apparatus has been described in detail in connection with the description of its construction so that but a brief summary is required. The mixture of gas and liquid is forced through the separator as by the pump means described and is instantly and completely separated into its components as already described, the liquid falling by gravity to the bottom of the container and the gas collecting thereabove and being drawn off as required. The liquid is thence forced by the pressure in the container to and through the intake device where it is highly saturated with gas by the efficient means described. The mixture thus formed passes thence to the pump which handles it efficiently as a relative light fluid and forces it through the separator, the same liquid being thus used repeatedly in continuous circulation through the system.

The invention affords a method of separating gases and liquids and compressing gases which is highly efficient and capable of being accomplished by simple, practical and inexpensive apparatus of comparatively small dimensions. As a result of its efficiency and of the simplicity of the apparatus, a gas under a desired pressure may be rapidly produced at a low cost of operation.

I claim as my invention:

1. The method of separating a gas and a liquid from a mixture thereof consisting in causing the mixture to flow through a multiplicity of small, "thin-plate" orifices having a low pressure difference between opposite sides thereof and allowing the mixture to expand freely from said orifices into a space under the lesser pressure whereby the sudden free expansion of the gas causes it to separate out and the liquid to condense and fall.

2. The method of separating a gas and a liquid from a mixture thereof consisting in causing the mixture to flow through a multiplicity of small, "thin-plate" orifices having a pressure difference between opposite sides thereof of not more than five pounds per square inch and allowing the mixture to expand freely from said orifices into a space under the lesser pressure whereby the sudden free expansion of the gas causes it to separate out and the liquid to condense and fall.

3. The method of separating a gas and a liquid from a mixture thereof consisting in causing the mixture to flow through a multiplicity of small, spaced orifices in a partition of less thickness than the width of said orifices with a low pressure difference between opposite sides thereof and allowing the mixture to expand freely from said orifices into a space under the lesser pressure whereby the sudden free expansion of the gas causes it to separate out and the liquid to condense and fall.

4. The method of separating a gas and a liquid from a mixture thereof consisting in causing the mixture to flow through a multiplicity of small, spaced orifices in a partition of less thickness than the width of said orifices with a pressure difference between opposite sides of said partition of not more than five pounds per square inch and allowing the mixture to expand freely from said orifices into a space under the lesser pressure whereby the sudden free expansion of the gas causes it to separate out and the liquid to condense and fall.

5. The method of compressing a gas consisting in mixing the gas with liquid under the application of pressure and subjecting the compressed mixture in a relatively fine state of subdivision to a sudden partial reduction of pressure thereby separating the mixture into liquid and compressed gas.

6. The method of compressing a gas consisting in moving a supply of liquid through a given path under pressure, injecting the gas into the liquid to produce a compressed mixture of gas and liquid, subdividing the mixture to effect a large surface exposure and subjecting the compressed, subdivided mixture to a sudden partial reduction in pressure to thereby separate the mixture into gas and liquid under pressure.

7. The method of compressing a gas consisting in forcing a supply of liquid through a given path under pressure, converting the pressure of the liquid at a given point in said path into velocity to effect a suction, injecting the gas into the liquid by means of said suction to produce beyond said point a compressed mixture of gas and liquid, subdividing the mixture to effect a large surface exposure, and projecting the subdivided mixture into a space of partially reduced pressure to thereby separate the gas under pressure from the liquid.

8. The method of compressing a gas consisting in forcing a supply of liquid through a continuous path under pressure, mixing the gas with the liquid at one point in said path to produce a compressed gas and liquid mixture, subdividing the mixture at another point in said path to effect a substantial surface exposure, and projecting the subdivided mixture into a space of partially reduced pressure to thereby separate the gas under pressure from the liquid.

9. The method of compressing a gas consisting in mixing the gas with liquid under the application of pressure and causing the mixture to flow through a multiplicity of small "thin-plate" orifices having a low pressure difference between opposite sides thereof.

10. The method of compressing a gas consisting in mixing the gas with liquid under the application of pressure and causing the mixture to flow through a multiplicity of small, "thin-plate" orifices having a pressure difference between opposite sides thereof of not more than five pounds per square inch.

11. The method of compressing a gas consisting in mixing the gas with liquid under the application of pressure and causing the mixture to flow through a multiplicity of small, spaced orifices in a partition of less thickness than the width of said orifices with a low pressure difference between opposite sides thereof.

12. The method of compressing a gas consisting in mixing the gas with liquid under the application of pressure and causing the mixture to flow through a multiplicity of small spaced orifices in a partition of less thickness than the width of said orifices with a low pressure difference between opposite sides of said partition of not more than five pounds per square inch.

13. The method of compressing a gas consisting in mixing the gas with liquid under the application of pressure and causing a sudden, slight expansion of the mixture through a plurality of small orifices in a partition of less thickness than the width of the individual orifices, with a pressure difference between opposite sides of said partition of not more than five pounds per square inch and allowing the mixture to expand freely from said orifices into a space in which the gas separates out and the liquid is condensed and falls.

14. An apparatus for compressing a gas comprising a conducting system, means for circulating a supply of liquid through said system under pressure, mixing means for admitting a supply of gas into the liquid in said system to form a compressed mixture thereof, separating means providing an expansion space of partially reduced pressure in said system, and jet means located between said mixing and separating means for projecting the mixture into said space in a state of subdivision affording substantial surface exposure to effect by said exposure and reduction in pressure a separation of the mixture into liquid and gas under pressure.

15. An apparatus for compressing a gas comprising a conducting system, means for circulating a supply of liquid through said system under pressure, mixing means for admitting a supply of gas into the liquid in said system to form a compressed mixture thereof, separating means having a chamber providing an expansion space of partially reduced pressure in said system, and means adjacent the top of said chamber provided with a plurality of jet openings for projecting said mixture into said space in a state of relatively fine subdivision, to separate the mixture into liquid and gas under pressure.

16. In an apparatus for compressing a gas, the combination of a conducting system, means for circulating a supply of liquid through said system under pressure, mixing means for introducing a supply of gas into the liquid in said system to form a compressed mixture thereof, separating container means in said system comprising a partition formed with a plurality of small orifices arranged in spaced relation, said partition having a thickness less than the width of the individual orifices, and means for maintaining a low pressure difference between opposite sides of said partition.

17. In an apparatus for compressing a gas, the combination of a conducting system, means for circulating a supply of liquid through said system under pressure, injecting means for introducing a supply of gas into the liquid in said system to form a compressed mixture thereof, separating means in said system comprising a container for receiving the compressed mixture having therein a partition formed with a plurality of small spaced orifices for separating the gas and liquid flowing therethrough, said partition having a thickness less than the width of the individual orifices, and means for maintaining a pressure difference of not more than five pounds between opposite sides of said partition.

18. In an apparatus for compressing a gas, the combination of a continuous conducting system, pump means for circulating a supply of liquid through said system under pressure, injector means for introducing a supply of gas into the liquid in said system to form a compressed mixture thereof, separating means in said system for receiving the compressed mixture having therein a partition formed with a multiplicity of small spaced orifices for separating the gas and liquid flowing therethrough, said partition having a thickness less than the width of the individual orifices, means for maintaining a pressure difference of not more than five pounds between opposite sides of said partition, and means for controlling the temperature of the liquid in said systems.

19. An apparatus for separating a gas and a liquid from a mixture thereof comprising a separating container provided with separate gas and liquid outlets and with a tubular partition having therein a plurality of small spaced orifices, means for supplying said mixture under pressure to said tubular partition, to cause the same to flow through said orifices, and means movable in said tubular partition for uncovering a variable proportion of orifice area and subjected to and moved automatically by the pressure of said mixture and the pressure external to the partition for governing the difference between said pressures.

20. An apparatus for separating a gas and a liquid from a mixture thereof comprising a separating container provided with separate gas and liquid outlets and with a tubular member having in its walls a plurality of small spaced orifices, means for supplying said mixture under pressure interiorly of said member and a part in said member subjected on its opposite sides to the pressures within and without said member respectively, and moved automatically by the difference between said pressures for uncovering a variable proportion of orifice area and thereby controlling said pressure difference.

21. An apparatus for separating a gas and a liquid from a mixture thereof comprising a separating container provided with separate gas and liquid outlets and with a tubular member having in its walls a plurality of "thin-plate" orifices arranged in spaced relation, means for supplying said mixture under pressure interiorly of said member, a part in said member subjected on its opposite sides to the pressures within and without said member, respectively, and moved automatically by the difference between said pressures for uncovering a variable proportion of orifice area and controlling said pressure difference, and means for varying the position of said part corresponding to a given pressure difference.

ARTHUR SHALER WILLIAMS.